United States Patent
Katz et al.

(10) Patent No.: US 11,000,796 B2
(45) Date of Patent: May 11, 2021

(54) TWO-STAGE METHOD FOR REMOVING $CO_2$ FROM SYNTHESIS GAS

(71) Applicant: BASF SE, Ludwigshafen am Rhein (DE)

(72) Inventors: Torsten Katz, Ludwigshafen (DE);
Ralf Notz, Ludwigshafen (DE);
Christian Kunkelmann, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 274 days.

(21) Appl. No.: 16/320,183

(22) PCT Filed: Jul. 27, 2017

(86) PCT No.: PCT/EP2017/068996
§ 371 (c)(1),
(2) Date: Jan. 24, 2019

(87) PCT Pub. No.: WO2018/024598
PCT Pub. Date: Feb. 8, 2018

(65) Prior Publication Data
US 2019/0262768 A1      Aug. 29, 2019

(30) Foreign Application Priority Data
Aug. 1, 2016 (EP) .................. 16182234

(51) Int. Cl.
*B01D 53/14* (2006.01)
*C01B 3/52* (2006.01)
*C10K 1/00* (2006.01)

(52) U.S. Cl.
CPC ..... *B01D 53/1406* (2013.01); *B01D 53/1425* (2013.01); *B01D 53/1475* (2013.01);
(Continued)

(58) Field of Classification Search
CPC ........ B01D 2252/103; B01D 2252/204; B01D 2252/20447; B01D 2252/20489;
(Continued)

(56) References Cited

FOREIGN PATENT DOCUMENTS

DE    37 35 717 A1    5/1989
EP    0 173 908 A2    3/1986
(Continued)

OTHER PUBLICATIONS

Machine translation of EP 0173908 (Year: 2021).*
International Search Report dated Aug. 31, 2017 in PCT/EP2017/068996 filed Jul. 27, 2017.

*Primary Examiner* — Cabrena Holecek
(74) *Attorney, Agent, or Firm* — Grüneberg and Myers PLLC

(57) ABSTRACT

In a process for removing $CO_2$ from a fluid stream by means of an aqueous absorption medium, a) the fluid stream is introduced into a first absorption zone and treated with partially regenerated absorption medium, b) the treated fluid stream is treated with regenerated absorption medium in a second absorption zone, giving a fluid stream which has been freed of $CO_2$ and a loaded absorption medium, c) the loaded absorption medium is depressurized in a first flash vessel to a pressure of from 1.2 to 3 bar absolute, giving a sub-partially regenerated absorption medium and a first $CO_2$-comprising gas stream, d) the sub-partially regenerated absorption medium is depressurized in a second flash vessel to a pressure of from 1 to 1.2 bar absolute, giving a partially regenerated absorption medium and a water vapor-comprising, second $CO_2$-comprising gas stream, e) a substream of the partially regenerated absorption medium is fed into the first absorption zone and a further substream of the partially regenerated absorption medium is fed into a stripper in which the partially regenerated absorption medium is thermally regenerated, with regenerated absorption medium and (Continued)

a third $CO_2$-comprising gas stream being obtained and the stripper being operated at a pressure which is at least 0.9 bar higher than the pressure in the first flash vessel, f) the regenerated absorption medium is recirculated to the second absorption zone, g) the water vapor-comprising, second $CO_2$-comprising gas stream is compressed by means of a jet pump and brought into direct heat exchange contact with the loaded absorption medium in the first flash vessel, with the jet pump being operated by means of the third $CO_2$-comprising gas stream. The latent heat of the water vapor-comprising gas streams remains in the process and the use of a costly compressor is dispensable.

10 Claims, 1 Drawing Sheet

(52) U.S. Cl.
CPC ................ *C01B 3/52* (2013.01); *C10K 1/005* (2013.01); *B01D 2252/103* (2013.01); *B01D 2252/204* (2013.01); *B01D 2252/20447* (2013.01); *B01D 2252/20489* (2013.01); *B01D 2252/504* (2013.01); *B01D 2257/504* (2013.01); *Y02C 20/40* (2020.08); *Y02P 20/151* (2015.11)

(58) Field of Classification Search
CPC ........ B01D 2252/504; B01D 2257/504; B01D 53/1406; B01D 53/1425; B01D 53/1475; C01B 3/52; C10K 1/005; Y02C 20/40; Y02P 20/151
See application file for complete search history.

(56) References Cited

FOREIGN PATENT DOCUMENTS

| | | | |
|---|---|---|---|
| EP | 0173908 A2 * | 3/1986 | ......... B01D 53/1493 |
| EP | 0 190 434 A2 | 8/1986 | |

* cited by examiner

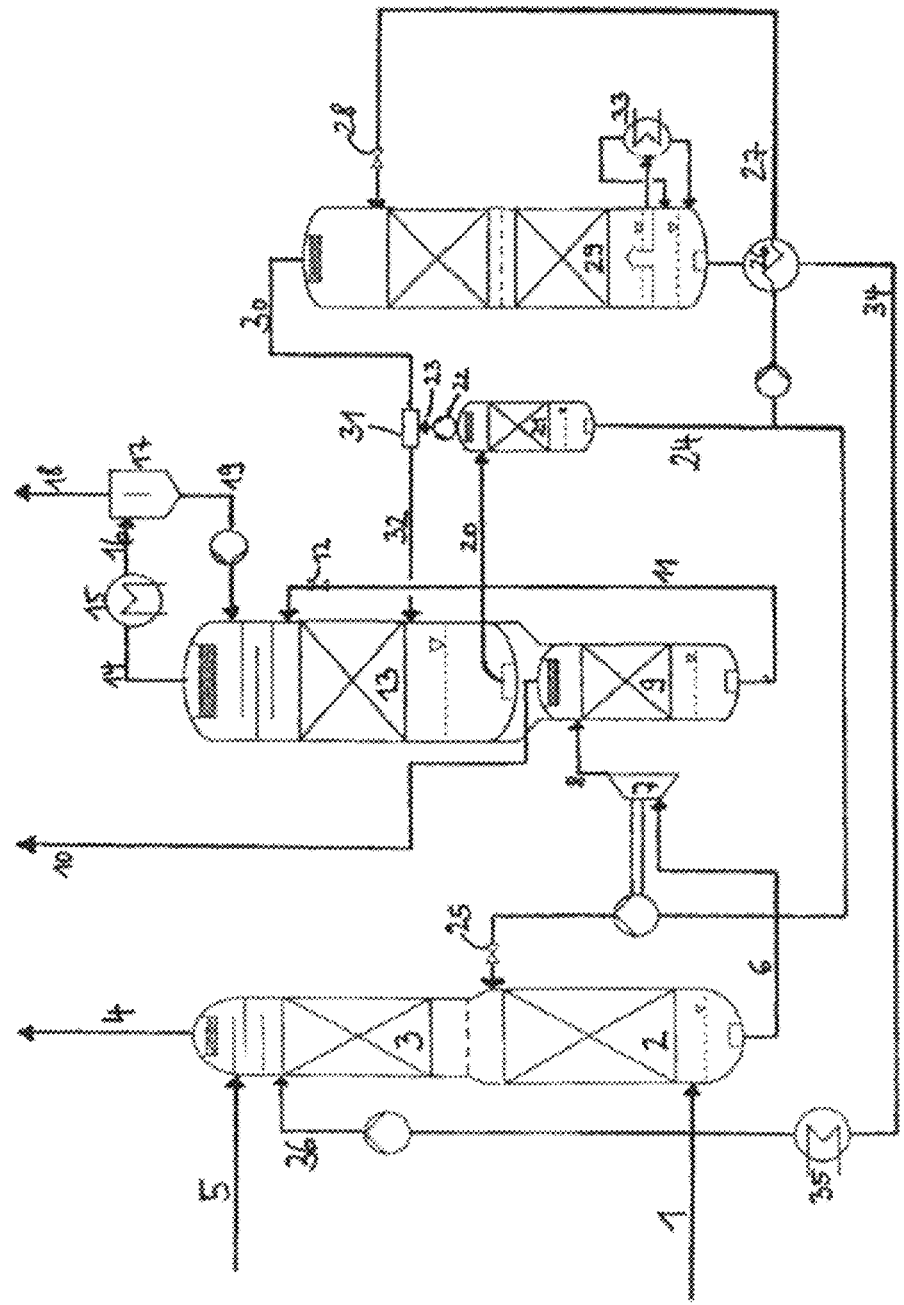

TWO-STAGE METHOD FOR REMOVING $CO_2$ FROM SYNTHESIS GAS

The present invention relates to a process for removing $CO_2$ from a fluid stream, in particular from synthesis gas.

The synthesis of ammonia by the Haber-Bosch process is the most important industrial process for preparing ammonia. The hydrogen required for this purpose usually originates from synthesis gas, viz. a gas mixture comprising mainly carbon monoxide and hydrogen. The carbon monoxide is converted in a water gas shift reaction into $CO_2$ and the carbon dioxide can subsequently be removed by gas scrubbing.

On the industrial scale, aqueous solutions of organic bases, e.g. amines such as, in particular, alkanolamines, are frequently used as absorption medium for removing acidic gases such as carbon dioxide from fluid streams. When acidic gases are dissolved, ionic products are formed from the base and the acidic gas constituents. The absorption medium can be regenerated by heating, depressurization to a lower pressure or stripping, with the ionic products reacting to form acidic gases again and/or the acidic gases being stripped out by means of steam. After the regeneration process, the absorption medium can be reused.

In the prior art, it has been proposed that these gas scrubs be configured as two-stage absorption and two-stage desorption processes. Such a procedure makes good sense from an energy point of view since only part of the volume of the loaded absorption medium has to be regenerated completely and the remaining part of the loaded absorption medium has to be only partially regenerated. The major part of the $CO_2$ is removed using the partially regenerated absorption medium in the first absorption step, and fine purification using the regenerated absorption medium is carried out in the second absorption step.

EP 0 190 434 A2 describes a process for removing $CO_2$ from gases. Here, the $CO_2$-comprising gas stream is introduced in succession into two absorbers and in these is brought into countercurrent contact firstly with a partially regenerated and subsequently with a regenerated aqueous, alkanolamine-comprising absorption medium in order to remove $CO_2$ from the gas stream by reaction with the absorption medium. To regenerate the loaded absorption medium, the latter is depressurized in a first flash vessel to a pressure above atmospheric pressure and subsequently in a further flash vessel to a subatmospheric pressure of from 0.3 to 1 bar. A substream of the partially regenerated absorption medium obtained is subsequently recirculated to the first absorption stage and a further substream is regenerated completely in a stripper. The installation of the subatmospheric pressure flash vessel enables the acidic gas absorption capacity of the partially regenerated absorption medium to be increased, which makes it possible to reduce the absorption medium flows and decrease the absorber or stripper diameter and improves the economics of the plant. Here, the subatmospheric pressure in the flash vessel is generated by means of a steam ejector which is operated by means of external driving steam in combination with a mechanical vacuum generation apparatus, e.g. a compressor. The combined vapors are fed into the first flash vessel. Water losses via the treated fluid stream and the liberated acidic gases or due to other physical losses are at the same time compensated for by the external driving steam and the water balance of the plant is ensured. The addition of external water to make up amounts lost (make-up water) is thus necessarily effected in the form of driving steam into the first flash vessel and the addition of further make-up water in other parts of the plant has to be omitted or at least greatly reduced in order to ensure the water balance. Since the treated gas stream carries amines with it when leaving the absorber and amine losses occur, it is, however, desirable to introduce the make-up water in liquid form into the absorber. The introduction of the make-up water into the absorber, ideally via a backscrubbing zone, leads to the amines comprised in the gas stream being at least partially retained and amine losses can be reduced. A further disadvantage of the known plant is the necessary use of a costly compressor for providing the subatmospheric pressure in the second flash vessel. A flash vessel operated at subatmospheric pressure is critical in combination with an ignitable gas atmosphere, e.g. a hydrogen atmosphere, and also in respect of safety aspects. Unnoticed leaks can lead to air or oxygen penetrating into the plant and forming an explosive atmosphere with hydrogen.

EP 0 173 908 A2 describes a similar process in which the flash vessel is not necessarily operated at subatmospheric pressure but, for example, at a pressure of preferably from 1 to 1.5 bar. Compared to the above-described process, the compressor can as a result either be completely avoided or be replaced by a cheaper blower, which further improves the economics of the plant. Absorption medium constituents and water are condensed out of the vapor from the second flash vessel in a condenser. However, in this procedure, the latent heat liberated in the condensation of the water vapor-comprising gas stream in the condenser is lost to the process.

It is an object of the present invention to provide a process for removing $CO_2$ from fluid streams, in particular for removing $CO_2$ from synthesis gas, in which the latent heat of the water vapor-comprising gas streams is kept in the process and which makes the use of a costly compressor unnecessary and whose economics are therefore improved compared to the processes from the prior art.

The object is achieved by a process for removing $CO_2$ from a fluid stream by means of an aqueous absorption medium, in which a) the fluid stream is introduced into a first absorption zone and treated with partially regenerated absorption medium, b) the treated fluid stream is treated with regenerated absorption medium in a second absorption zone, giving a fluid stream which has been freed of $CO_2$ and a loaded absorption medium, c) the loaded absorption medium is depressurized in a first flash vessel to a pressure of from 1.2 to 3 bar (absolute), giving a sub-partially regenerated absorption medium and a first $CO_2$-comprising gas stream, d) the sub-partially regenerated absorption medium is depressurized in a second flash vessel to a pressure of from 1 to 1.2 bar (absolute), giving a partially regenerated absorption medium and a water vapor-comprising, second $CO_2$-comprising gas stream, e) a substream of the partially regenerated absorption medium is fed into the first absorption zone and a further substream of the partially regenerated absorption medium is fed into a stripper in which the partially regenerated absorption medium is thermally regenerated, with regenerated absorption medium and a third $CO_2$-comprising gas stream being obtained and the stripper being operated at a pressure which is at least 0.9 bar higher than the pressure in the first flash vessel, f) the regenerated absorption medium is recirculated to the second absorption zone, g) the water vapor-comprising, second $CO_2$-comprising gas stream is compressed by means of a jet pump and brought into direct heat exchange contact with the loaded absorption medium in the first flash vessel, with the jet pump being operated by means of the third $CO_2$-comprising gas stream.

BRIEF DESCRIPTION OF THE DRAWING

The FIGURE shows the treatment of a shifted synthesis gas in a plant.

DETAILED DESCRIPTION OF THE INVENTION

All pressures indicated in the present document are absolute pressures.

In the first step of the process, a fluid stream is introduced into a first absorption zone for treatment with a partially regenerated absorption medium and subsequently introduced into a second absorption zone for treatment with a regenerated absorption medium.

According to the invention, the $CO_2$-comprising fluid stream is brought into contact with a partially regenerated absorption medium in a first absorption zone. This gives a fluid stream which has been at least partially freed of $CO_2$. The fluid stream is subsequently treated with regenerated absorption medium in a second absorption zone, giving a fluid stream which has been freed of $CO_2$ (hereinafter also referred to as treated fluid stream) and an absorption medium loaded with $CO_2$. The partially loaded absorption medium obtained in the second absorption zone, the absorption capacity of which is generally not exhausted, is preferably fed into the first absorption zone.

The treatment of the fluid stream with the absorption medium is preferably carried out in countercurrent. The fluid stream is in this case generally fed into a lower region of the respective absorption zone and the absorption medium is fed into an upper region. To improve contact and creation of a large mass transfer interface, the absorption zone generally comprises internals, e.g. random packing elements, ordered packing and/or trays. The treatment of the fluid stream with the absorption medium is appropriately carried out in an absorption tower or an absorption column, e.g. a column having random packing elements, a column having ordered packing or a tray column. The absorption zone is considered to be the section of an absorption column in which the fluid stream comes into mass transfer contact with the absorption medium.

The two absorption zones can be arranged above one another in a column. In this case, the fluid stream is fed into the bottom of the column, the partially regenerated absorption medium is fed into the upper region of the first absorption zone and the regenerated absorption medium is introduced in the upper region of the second absorption zone, i.e. at the top of the column. The partially loaded absorption medium running down from the second absorption zone then passes through the first absorption zone.

A further embodiment is the arrangement of the two absorption zones in two separate columns connected in series.

The fluid stream is introduced into the first absorption zone with a pressure of from 10 to 80 bar, preferably from 20 to 40 bar. The pressure in the first and second absorption zones is, disregarding unavoidable pressure drops, preferably substantially the same. The temperature of the partially regenerated absorption medium introduced into the first absorption zone is generally from 50 to 120° C., preferably from 70 to 90° C. The temperature of the regenerated absorption medium introduced into the second absorption zone is generally from 20 to 70° C., preferably from 30 to 55° C.

In one embodiment of the invention, the fluid stream which has been freed of $CO_2$ is brought into contact with an aqueous scrubbing liquid in a backscrubbing zone in order to at least partially transfer entrained absorption medium constituents and decomposition products thereof into the scrubbing liquid. This gives a fluid stream which has been freed of absorption medium constituents, decomposition products thereof and $CO_2$ and a scrubbing liquid loaded with absorption medium constituents and decomposition products thereof. The scrubbing zone preferably has random packing elements, ordered packing and/or trays in order to intensify contact of the fluid stream with the scrubbing liquid. The scrubbing liquid can be distributed above the scrubbing zone over the cross section of the scrubbing zone by means of suitable liquid distributors.

In preferred embodiments, the scrubbing zone is configured as a section of an absorption column arranged above the second absorption zone, i.e. a section of the absorption column above the point at which the regenerated absorption medium is fed in.

Suitable aqueous scrubbing liquids are aqueous liquids which are largely free of amines and amine decomposition products. The scrubbing liquid can be an intrinsic liquid, i.e. an aqueous liquid which arises at a different place in the process, or an aqueous liquid introduced from the outside (make-up water).

In preferred embodiments, the scrubbing liquid is formed entirely or partly by fresh water from an external source (make-up water), which is fed into the scrubbing zone in order to compensate for water losses. This is necessary since the plant continually loses water in the form of water vapor which is discharged via the treated fluid stream and the liberated acidic gases or due to other physical losses. In a preferred embodiment, the aqueous scrubbing liquid is conveyed in a single pass through the scrubbing zone without circulation by pumping. The scrubbing liquid running down from the scrubbing zone is preferably fed into the second absorption zone.

According to the invention, the regeneration of the loaded absorption medium is carried out by a combination of depressurization in flash vessels and desorption in a stripper.

In one embodiment of the invention, the loaded absorption medium is depressurized into a flash vessel (high-pressure flash) located upstream of the first flash vessel, with the upstream flash vessel being operated at a higher pressure than the first flash vessel. In general, the pressure in the upstream flash vessel is from 6 to 10 bar, preferably from 7 to 9 bar. This step gives a coabsorbate-comprising gas stream. The term coabsorbate refers to constituents of the fluid stream other than acidic gases which physically dissolve in the absorption medium in the absorption step. These include compounds such as nitrogen, hydrogen, carbon monoxide, argon and/or hydrocarbons such as methane. In the depressurization in the high-pressure flash, part of the $CO_2$ can also be liberated. The pressure in the high-pressure flash is preferably set so that the major part of the $CO_2$ is not liberated. This step gives a loaded absorption medium which has largely been freed of coabsorbate and is then fed into the first flash vessel.

The kinetic energy liberated on depressurization of the loaded absorption medium into the upstream flash vessel can optionally be recovered by means of an expansion turbine and this can be used, for example, for driving a pump, which saves electric energy. The mechanical energy can be used directly for driving a coupled-on pump by, for example, the expansion turbine and the pump impeller being located on a common shaft. As an alternative, the kinetic energy can be converted into electric energy and used for operating the pump.

According to the invention, the loaded absorption medium or, if the optionally upstream flash vessel is used, the loaded absorption medium which has been largely freed of coabsorbate is depressurized into the first flash vessel to a pressure of from 1.2 to 3 bar, preferably from 1.3 to 1.8 bar. This gives a first $CO_2$-comprising gas stream and a sub-partially regenerated absorption medium. For the present purposes, a sub-partially regenerated absorption medium is an absorption medium whose $CO_2$ loading is between that of the loaded absorption medium and that of the partially regenerated absorption medium.

In one embodiment of the invention, absorption medium constituents which have been carried out are condensed out from the first $CO_2$-comprising gas stream. For this purpose, the first $CO_2$-comprising gas stream is cooled in a heat exchanger and the gas/liquid stream obtained is separated into the phases by means of a separator. The $CO_2$-comprising gas stream obtained can then be discharged from the plant. The condensate separated off in the separator, which comprises aqueous absorption medium constituents, is recirculated to the first flash vessel.

The condensate obtained is preferably recirculated via a backscrubbing zone into the flash vessel. In general, this backscrubbing zone has internals such as random packing elements, ordered packing and/or trays in order to at least partly hold back absorption medium constituents entrained in the gas stream. The discharge or loss of absorption medium constituents can be avoided by means of this recirculation.

The sub-partially regenerated absorption medium is then depressurized in a second flash vessel to a pressure which is equal to or slightly above atmospheric pressure, i.e. from 1 to 1.2 bar. This step gives a second $CO_2$-comprising gas stream comprising water vapor and also a partially regenerated absorption medium.

Part of the absorbed $CO_2$ is liberated again by the depressurization steps. The partially regenerated absorption medium has $CO_2$ absorption capacity; a substream of the partially regenerated absorption medium is fed into the first absorption zone. Another substream of the partially regenerated absorption medium is fed to a stripper for a thermal regeneration step. This is energetically advantageous since it is not necessary for the entire volume of the partially regenerated absorption medium to be thermally regenerated.

A thermal regeneration step is carried out in the stripper in order to liberate the $CO_2$ still comprised in the partially regenerated absorption medium. Stripping gas is required for stripping and this is produced by partial vaporization of the absorption medium in the bottom of the stripper. This results in a thermal equilibrium shift of the reversible absorption of $CO_2$ in the absorption medium and the $CO_2$ still comprised is liberated. The desorbed $CO_2$ can be taken off as third $CO_2$-comprising gas stream at the top of the stripper. In addition, a regenerated absorption medium is obtained and this is recirculated into the second absorption zone.

In general, the regenerated absorption medium is cooled to a suitable absorption temperature before being recirculated into the second absorption zone. To exploit the energy comprised in the hot regenerated absorption medium, preference is given to preheating the partially regenerated absorption medium from the second flash vessel by indirect heat exchange with the hot regenerated absorption medium. As a result of the heat exchange, the partially regenerated absorption medium is brought to a higher temperature so that a smaller energy input is necessary in the regeneration step.

Partial regeneration of the partially regenerated absorption medium with liberation of $CO_2$ can also occur as a result of the heat exchange.

The pressure of the substream of the partially regenerated absorption medium which is fed to the stripper has to be increased by means of a pump or by hydrostatics before entry into the stripper to such an extent that a pressure difference of at least 0.9 bar compared to the first flash vessel prevails. For the purposes of the invention, the stripper is operated at a higher pressure than the first flash vessel since the third $CO_2$-comprising gas stream formed after regeneration in the stripper is, in the present process, recirculated to the first flash vessel and operates a jet pump by means of which the water vapor-comprising, second $CO_2$-comprising gas stream is compressed and fed into the first flash vessel. According to the invention, it is thus possible to bring the water vapor-comprising, second $CO_2$-comprising gas stream from a low pressure level to the pressure level of the first flash vessel by means of the jet pump operated by means of the third $CO_2$-comprising gas stream and thus recirculate both gas streams into the first flash vessel and bring them into direct heat exchange contact with the loaded absorption medium in the first flash vessel. The latent heat of the water vapor-comprising, second gas stream can be exploited in this way.

In the first flash vessel, the loaded absorption medium and the second $CO_2$-comprising gas stream which has been compressed by means of the third $CO_2$-comprising gas stream are preferably conveyed in countercurrent. The first flash vessel is for this purpose preferably configured as a column. The mass transfer and heat exchange between the loaded absorption medium and the $CO_2$-containing gas streams can be improved by means of internals, in particular packing.

In many cases, it is advantageous to increase the pressure of the water vapor-comprising, second $CO_2$-gas stream before entry into the jet pump. A blower is suitable for this purpose. A blower is a fluid energy machine which is driven from the outside and transports and compresses a gaseous medium with a pressure ratio of more than 1, preferably less than 1.5, prevailing between suction side and pressure side. Blowers usually have an impeller rotating in a housing. It is an advantage of the invention that no compressor is required for increasing the pressure. In the case of a compressor, a pressure ratio of more than 3 prevails between suction side and pressure side.

Compressors are, for example, configured as piston compressors or rotary compressors. A compressor is costly both to procure and to run.

The pressure of the water vapor-comprising, second $CO_2$-comprising gas stream is preferably increased by from 0.05 to 0.5 bar, preferably by from 0.1 to 0.25 bar, by means of a blower. In combination with the abovementioned jet pump, the pressure can in this way be increased to the pressure level of the first flash vessel.

The composition of the absorption medium is not critical; it is possible to use any absorption media which can also contain physical solvents in addition to water. The absorption medium is preferably an aqueous solution of at least one amine. The amine preferably comprises at least one primary or secondary amine.

Preferred amines are the following:
i) Amines of the formula I:

$$NR^1(R^2)_2 \quad (I)$$

where $R^1$ is selected from among $C_2$-$C_6$-hydroxyalkyl groups, $C_1$-$C_6$-alkoxy-$C_2$-$C_6$-alkyl groups, hydroxy-$C_1$-$C_6$-alkoxy-$C_2$-$C_6$-alkyl groups and 1-piperazinyl-$C_2$-$C_6$-alkyl groups and $R^2$ is selected independently from among H, $C_1$-$C_6$-alkyl groups and $C_2$-$C_6$-hydroxyalkyl groups;

(ii) amines of the formula II:

$$R^3R^4N{-}X{-}NR^5R^6 \quad (II)$$

where $R^3$, $R^4$, $R^5$ and $R^6$ are selected independently from among H, $C_1$-$C_6$-alkyl groups, $C_2$-$C_6$-hydroxyalkyl groups, $C_1$-$C_6$-alkoxy-$C_2$-$C_6$-alkyl groups and $C_2$-$C_6$-aminoalkyl groups and X is a $C_2$-$C_6$-alkylene group, $-X^1-NR^2-X^2-$ or $-X^1-O-X^2-$, where $X^1$ and $X^2$ are each, independently of one another, a $C_2$-$C_6$-alkylene group and $R^7$ is H, a $C_1$-$C_6$-alkyl group, $C_2$-$C_2$-hydroxyalkyl group or $C_2$-$C_6$-aminoalkyl group;

(iii) 5- to 7-membered saturated heterocycles which have at least one nitrogen atom in the ring and can comprise one or two further heteroatoms selected from among nitrogen and oxygen in the ring;

(iv) sterically hindered amines, e.g. amines of the formula III:

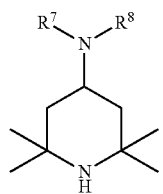

where $R^7$ and $R^8$ are selected independently from among hydrogen, $C_{1-6}$-alkyl, amino-$C_{2-6}$-alkyl, $C_{1-4}$-alkylamino-$C_{2-6}$-alkyl and di($C_{1-4}$-alkyl)amino-$C_{2-6}$-alkyl, and (v) mixtures thereof.

Specific examples are:

(i) 2-aminoethanol (monoethanolamine), 2-(methylamino)ethanol, 2-(ethyl-amino)ethanol, 2-(n-butylamino) ethanol, 2-amino-2-methylpropanol, N-(2-amino-ethyl)piperazine, methyldiethanolamine, ethyldiethanolamine, dimethylaminopropanol, t-butylaminoethoxyethanol, 2-aminomethylpropanol;

(ii) 3-methylaminopropylamine, ethylenediamine, diethylenetriamine, triethylenetetramine, 2,2-dimethyl-1,3-diaminopropane, hexamethylenediamine, 1,4-diaminobutane, 3,3-iminobispropylamine, tris(2-aminoethyl)amine, bis(3-dimethylaminopropyl)amine, tetramethylhexamethylenediamine;

(iii) piperazine, 2-methylpiperazine, N-methylpiperazine, 1-hydroxyethylpiperazine, 1,4-bis(hydroxyethyl)piperazine, 4-(hydroxyethyl)piperidine, homopiperazine, piperidine, 2-hydroxyethylpiperidine and morpholine;

(iv) 4-methylamino-2,2,6,6-tetramethylpiperidine, 4-(n-propylamino)-2,2,6,6-tetra-methylpiperidine, 4-(n-butylamino)-2,2,6,6-tetramethylpiperidine, 4-(2-ethylamino-ethyl-amino)-2,2,6,6-tetramethylpiperidine, 4-(3-dimethylaminopropylamino)-2,2,6,6-tetramethylpiperidine;

(v) mixtures thereof.

In a preferred embodiment, the absorption medium comprises at least one of the amines monoethanolamine (MEA), methylaminopropylamine (MAPA), piperazine, diethanolamine (DEA), triethanolamine (TEA), diethylethanolamine (DEEA), diisopropylamine (DIPA), aminoethoxyethanol (AEE), dimethylaminopropanol (DIMAP) and methyldiethanolamine (MDEA) or mixtures thereof.

In a particularly preferred embodiment, the absorption medium comprises a combination of the secondary amine piperazine and the tertiary amine methyldiethanolamine (MDEA).

In general, the absorption medium comprises from 10 to 60% by weight of amine, preferably from 35 to 60% by weight, particularly preferably 50% by weight. In general, the proportion of primary or secondary amine is from 3 to 10% by weight, preferably from 5 to 8% by weight, with the remaining amount of amine being made up by the tertiary amine and the remainder of the total amount of the absorption medium being made up by water.

The absorption medium can also comprise additives such as corrosion inhibitors, enzymes, etc. In general, the amount of such additives is in the range from about 0.01 to 3% by weight of the absorption medium.

The process of the invention is suitable for treating fluid streams, in particular gas streams of all types, which comprise $CO_2$ and optionally further acidic gases such as $H_2S$.

Fluid streams containing gases such as $CO_2$ and, optionally, $H_2S$, are gases such as natural gas, synthesis gas, coke oven gas, cracking gas, coal gasification gas, recycle gas, landfill gases and combustion gases or else liquids which are essentially immiscible with the absorption medium, e.g. LPG (liquefied petroleum gas) or NGL (natural gas liquids).

In preferred embodiments, the fluid stream is a hydrogen-comprising fluid stream; such streams include synthesis gases which can, for example, be produced by coal gasification or steam reforming and have optionally been subjected to a water gas shift reaction; the synthesis gases are used, for example, for the production of ammonia, methanol, formaldehyde, acetic acid, urea, for Fischer-Tropsch synthesis or for energy generation in an integrated gasification combined cycle (IGCC) process. Typical shifted synthesis gases which can be treated according to the invention comprise from about 15 to 35% by volume of $CO_2$, from about 35 to 70% by volume of $H_2$, from about 10 to 30% by volume of $N_2$ and up to about 5% by volume of other gases such as CO and $CH_4$.

The invention is illustrated by the accompanying drawing and the following example.

As shown in FIG. 1, a $CO_2$-comprising fluid stream, e.g. shifted synthesis gas, is fed via line 1 into the lower region of the first absorption zone 2. At the same time, a partially regenerated absorption medium is introduced via line 24 into the upper region of the first absorption zone 2. After leaving the first absorption zone 2, the treated fluid stream flows through the second absorption zone 3 for fine purification. Regenerated absorption medium is introduced via line 36 into the upper region of the second absorption zone 3, after the absorption medium supplied via line 34 has been cooled to a suitable temperature in the heat exchanger 35. The fluid stream which has been freed of $CO_2$ leaves the second absorption zone 3 via line 4. In addition, fresh water (make-up water) is continuously fed in via line 5 above the second absorption zone 3. The amount of water is advantageously sufficient to make up for the water losses of the system. At the bottom of the first absorption zone 2, the loaded absorption medium is taken off and depressurized via line 6, a turbine 7 and line 8 into the HP flash 9. A coabsorbate-comprising gas stream is taken off via line 10. The loaded absorption medium which has been largely freed of coabsorbate is taken off at the bottom of the HP flash 9 and depressurized via line 11 into the upper region of the first flash vessel 13. A first $CO_2$-comprising gas stream is taken off via line 14 at the top of the first flash vessel 13: entrained absorption medium constituents and water are condensed out of the gas stream in the heat exchanger 15; the phases are separated in the separation vessel 17 and the condensate is pumped via line 19 back into the first flash vessel 13; the dried, first $CO_2$-comprising gas stream leaves the plant via line 18. At the bottom of the first flash vessel 13, sub-partially regenerated absorption medium is taken off and conveyed via line 20 into the second flash vessel 21 and depressurized. The partially regenerated absorption medium 21 obtained in the bottom of the second flash vessel is partly pumped via line 24 to the first absorption zone 2. A further substream passes through the heat exchanger 26 and is pumped via line 27 into the stripper 29. The pump increases the pressure of the partially regenerated absorption medium before entry into the stripper 29. In the stripper 29, part of the absorption medium is vaporized by means of the heater 33 at the bottom, which makes thermal regeneration of the partially regenerated absorption medium in the stripper 29 possible. The regenerated absorption medium obtained at the bottom of the stripper 29 passes through the heat exchanger 26 and transfers part of the heat by indirect heat exchange to the partially regenerated absorption medium from line 27. The regenerated absorption medium is subsequently pumped via line 34, heat exchanger 35 and line 36 back into the second absorption zone 3. A third $CO_2$-comprising gas stream is taken off at the top of the stripper via line 30. This gas stream serves as driving vapor for the jet pump 31. At the top of the second flash vessel 21, the water vapor-comprising, second $CO_2$-comprising gas stream is compressed by means of the blower 22 and subsequently conveyed via line 23 into the jet pump 31. The compressed vapor is introduced via line 32 into the bottom of the first flash vessel 13.

EXAMPLE 1

The following abbreviations are used:
T Temperature
p Pressure
$V_n$ Loading
V Volume flow (on a water-free basis)
ppm parts per million
H Height
D Diameter
$V_{pack}$ Packing volume
standard $m^3$ Standard cubic meters (at $p_n$=1.0 bar; $T_n$=273.15 K)

The treatment of a shifted synthesis gas in a plant as shown in FIG. 1 was simulated. BASF's in-house software Chemasim was used for the simulation calculation (comparable results are obtained when using the commercially available software Aspen Plus (producer: AspenTech, Burlington/Mass., USA). The synthesis gas has the following composition (on a water-free basis): $CO_2$ (17.87% by volume), CO (0.27% by volume), $H_2$ (59.82% by volume), $N_2$ (21.51% by volume), $CH_4$ (0.53% by volume). The gas is saturated with water at 62.8° C. and 28.0 bar.

The absorption medium is: methyldiethanolamine MDEA (41.9% by weight), piperazine (8.1% by weight), water (50% by weight).

The following parameters of the plant were used as a basis:

| # | Component | H [m] | D [m] | $V_{pack}$ [$m^3$] |
|---|---|---|---|---|
| 2 | first absorption zone | 5.35 | 4.77 | 95.6 |
| 3 | second absorption zone | 6.15 | 3.39 | 55.5 |
| 9 | upstream flash vessel | 2.00 | 4.15 | 27.1 |
| 13 | first flash vessel | 5.00 | 4.78 | 89.8 |
| 21 | second flash vessel | 2.00 | 4.74 | 35.3 |
| 29 | stripper | 10.00 | 3.08 | 74.3 |

Table 1 summarizes the essential properties and compositions for the various fluid, absorption medium and gas streams.

TABLE 1

| # | Designation of the stream | T [° C.] | p [bar] | $V_n$ [standard $m^3$ of $CO_2$/t]* | $\dot{V}$ [$m^3$/h] | $CO_2$ [mol %]** | $\dot{V}$ [standard $m^3$/h] |
|---|---|---|---|---|---|---|---|
| 1 | $CO_2$-comprising fluid stream | 62.8 | 28.0 | | | 17.9 | 290529 |
| 36 | Regenerated absorption medium after cooling | 50.0 | 27.8 | 2.4 | 430.4 | | |
| 4 | Fluid stream freed of $CO_2$ | 50.0 | 27.8 | | | <100 mol-ppm | 238026 |
| 5 | Make up water | 50.0 | 27.8 | | 1.0 | | |
| 6 | Loaded absorption medium | 87.1 | 28.0 | 49.8 | 2381.4 | | |
| 10 | Coabsorbate-comprising gas stream | 87.0 | 8.8 | | | 38.8 | 749 |
| 11 | Loaded absorption medium which has been largely freed of coabsorbate | 87.0 | 8.8 | | 2379.5 | | |
| 18 | First $CO_2$-containing gas stream | 40.0 | 1.5 | | | 99.7 | 51756 |
| 20 | Sub-partially regenerated absorption medium | 82.3 | 1.65 | 38.5 | 2373.3 | | |
| 23 | Water vapor-comprising, second $CO_2$-comprising gas stream | 93.8 | 1.2 | | | 100.0 | 21385 |
| 24 | Partially regenerated absorption medium | 77.8 | 1.02 | 33.3 | 2353.9 | | |
| 30 | Third $CO_2$-comprising gas stream | 114.1 | 2.5 | | | 100.0 | 14130 |
| 34 | Regenerated absorption medium after regenerated/partially regenerated heat exchange | 87.8 | 2.6 | 2.4 | 442.5 | | |

*based on the absorption medium
**water-corrected

The invention claimed is:

1. A process for removing $CO_2$ from a fluid stream via an aqueous absorption medium, the process comprising:
   a) introducing the fluid stream into a first absorption zone and treating the fluid stream with a partially regenerated absorption medium,
   b) treating the treated fluid stream obtained in a) with a regenerated absorption medium in a second absorption zone, giving a fluid stream free of $CO_2$ and a loaded absorption medium,
   c) depressurizing the loaded absorption medium in a first flash vessel to a pressure of from 1.2 to 3 bar absolute, giving a sub-partially regenerated absorption medium and a first $CO_2$-comprising gas stream, d) depressurizing the sub-partially regenerated absorption medium i-s in a second flash vessel to a pressure of from 1 to 1.2 bar absolute, giving a partially regenerated absorption medium and a water vapor-comprising, second $CO_2$-comprising gas stream, e) feeding a substream of the partially regenerated absorption medium into the first absorption zone and feeding a further substream of the partially regenerated absorption medium into a stripper in which the partially regenerated absorption medium is thermally regenerated, thereby obtaining regenerated absorption medium and a third $CO_2$-comprising gas stream and operating the stripper at a pressure which is at least 0.9 bar higher than the pressure in the first flash vessel, f) recirculating the regenerated absorption medium to the second absorption zone, and g) compressing the water vapor-comprising, second $CO_2$-comprising gas stream via a jet pump and bringing the water-vapor-comprising, second $CO_2$-comprising gas stream into direct heat exchange contact with the loaded absorption medium in the first flash vessel, with the jet pump being operated by the third $CO_2$-comprising gas stream.

2. The process according to claim 1, wherein the pressure of the water vapor-comprising, second $CO_2$-comprising gas stream is increased by a blower before entry into the jet pump.

3. The process according to claim 1, wherein the substream of the partially regenerated absorption medium which is fed into the stripper is preheated by indirect heat exchange with the regenerated absorption medium.

4. The process according to claim 1, wherein the loaded absorption medium is depressurized to a pressure ranging from 6 to 10 bar absolute before depressurization thereof in the first flash vessel, giving a coabsorbate-comprising gas stream and a loaded absorption medium which is free of coabsorbate and is fed into the first flash vessel.

5. The process according to claim 1, wherein absorption medium constituents are condensed out from the first $CO_2$-comprising gas stream to obtain a condensate and the condensate is recirculated into the first flash vessel.

6. The process according to claim 5, wherein the condensate is recirculated via a backscrubbing zone into the first flash vessel.

7. The process according to claim 1, wherein the fluid stream free of $CO_2$ is conveyed through a backwashing zone in which the fluid stream is treated with an aqueous liquid.

8. The process according to claim 7, wherein the aqueous liquid is water from an external source to make up for water losses.

9. The process according to claim 1, wherein the aqueous absorption medium is an aqueous solution of an amine.

10. The process according to claim 1, wherein the fluid stream is a synthesis gas or a shifted synthesis gas.

* * * * *